(12) United States Patent
Yoshitake et al.

(10) Patent No.: US 11,709,083 B2
(45) Date of Patent: Jul. 25, 2023

(54) FLOW-RATE MEASURING APPARATUS CAPABLE OF ACCURATELY MEASURING FLOW RATE OF FLUID CONTAINING FOREIGN OBJECTS

(71) Applicant: OMRON Corporation, Kyoto (JP)

(72) Inventors: Naoki Yoshitake, Kusatsu (JP); Yui Ishida, Nara (JP); Yoshitaka Tsurukame, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 113 days.

(21) Appl. No.: 17/274,964

(22) PCT Filed: Mar. 14, 2019

(86) PCT No.: PCT/JP2019/010620
§ 371 (c)(1),
(2) Date: Mar. 10, 2021

(87) PCT Pub. No.: WO2020/183719
PCT Pub. Date: Sep. 17, 2020

(65) Prior Publication Data
US 2022/0034694 A1    Feb. 3, 2022

(51) Int. Cl.
*G01F 1/66* (2022.01)

(52) U.S. Cl.
CPC .................... *G01F 1/662* (2013.01)

(58) Field of Classification Search
None
See application file for complete search history.

(56) References Cited

U.S. PATENT DOCUMENTS

| 8,234,933 B2* | 8/2012 | Fukuhara ............... G01F 1/704 |
| | | 73/861.25 |
| 2010/0154562 A1* | 6/2010 | Fukuhara ............... G01F 1/704 |
| | | 73/861.25 |
| 2021/0356304 A1 | 11/2021 | Ishida et al. |

FOREIGN PATENT DOCUMENTS

| EP | 3922957 A1 | 12/2021 |
| JP | S5527935 A | 2/1980 |

(Continued)

OTHER PUBLICATIONS

EPO Extended European Search Report corresponding to EP Application No. 19919397.0; dated Sep. 23, 2022.

(Continued)

*Primary Examiner* — Harshad R Patel
(74) *Attorney, Agent, or Firm* — Cantor Colburn LLP

(57) ABSTRACT

A flow-rate measuring apparatus transmits and receives a measurement signal between first and second transducers through a fluid inside a pipe, the measurement signal having a plurality of frequencies and a time length. The flow-rate measuring apparatus calculates a correlation coefficient between a reference signal corresponding to the transmitted measurement signal, and the received measurement signal. The flow-rate measuring apparatus calculates a flow rate of the fluid inside the pipe based on the measurement signal, when a peak value of the correlation coefficient is higher than a threshold. The flow-rate measuring apparatus retransmits the measurement signal with changing at least one of the frequency and the time length of the measurement signal, when the peak value of the correlation coefficient is equal to or lower than the threshold.

6 Claims, 13 Drawing Sheets

(56) References Cited

FOREIGN PATENT DOCUMENTS

| JP | 2005037290 A | 2/2005 |
|----|--------------|--------|
| JP | 2008304281 A | 12/2008 |

OTHER PUBLICATIONS

International Search Report for International Application No. PCT/JP2019/010620; dated Jun. 18, 2019.
PCT Written Opinion of the International Searching Authority for International Application No. PCT/JP2019/010620 dated Jun. 18, 2019.

* cited by examiner

FLOW-RATE MEASURING APPARATUS CAPABLE OF ACCURATELY MEASURING FLOW RATE OF FLUID CONTAINING FOREIGN OBJECTS

CROSS REFERENCE TO RELATED APPLICATIONS

This is the U.S. national stage of application No. PCT/JP2019/010620, filed on Mar. 14, 2019. Priority is hereby claimed and the disclosure of which is also incorporated herein by reference.

TECHNICAL FIELD

The present disclosure relates to a flow-rate measuring apparatus for measuring a flow rate of a fluid inside a pipe having a predetermined cross-sectional area.

BACKGROUND ART

Patent Document 1 discloses an ultrasonic flow-rate measurement method for measuring a flow rate of a liquid using ultrasonic waves. According to the method of Patent Document 1, ultrasonic waves are transmitted in forward and backward directions of flow of a liquid using a pair of ultrasonic vibrators arranged upstream and downstream of a flow path through which the liquid flows, the pair of ultrasonic vibrators being arranged so as to oppose to each other, and then, a volumetric flow rate of the liquid is calculated based on a difference between propagation times of a ultrasonic wave propagating in the forward direction and a ultrasonic wave propagating in the backward direction. The method of Patent Document 1 includes a step of transmitting and receiving ultrasonic waves between the pair of ultrasonic vibrators to obtain ultrasonic waveform signals. The method of Patent Document 1 includes a step of comparing the plurality of ultrasonic waveform signals obtained, to calculate a correlation function of the waveform signals. The method of Patent Document 1 includes a step of determining whether or not a waveform signal is valid for measurement based on a correlation value of the correlation function of the waveform signals, calculating the difference between propagation times of the ultrasonic waves based on the valid waveform signal, and calculating the volumetric flow rate of the liquid based on the difference in the propagation time.

CITATION LIST

Patent Documents

PATENT DOCUMENT 1: Japanese patent laid-open application No. JP 2008-304281 A

SUMMARY OF INVENTION

Technical Problem

Foreign objects may flow in a pipe (flow path) together with a fluid, the foreign object including dusts, air bubbles (when the fluid is a liquid), etc. When such foreign objects exist, measurement signals (ultrasonic waves or the like) are diffusely reflected by the foreign objects, and thus, the accuracy of a measured flow rate degrades.

The method of Patent Document 1 determines whether or not the waveform signal is valid for measurement, and calculates the flow rate of the liquid based on only the valid waveform signal. However, when the liquid contains a large amount of foreign objects, a valid waveform signal can not be obtained, and therefore, the flow rate of the liquid can not be calculated. Therefore, there is a demand for a flow-rate measuring apparatus capable of accurately measuring a flow rate of a fluid even when the fluid contains a large amount of foreign objects.

An object of the present disclosure is to provide a flow-rate measuring apparatus capable of accurately measuring a flow rate of a fluid even when the fluid contains foreign objects.

Solution to Problem

According to an aspect of the present disclosure, a flow-rate measuring apparatus is provided for measuring a flow rate of a fluid inside a pipe having a predetermined cross-sectional area. The flow-rate measuring apparatus is connected to a first and second transducers provided at different positions in the pipe, respectively, the first transducer converting an electrical signal into an acoustic signal, the second transducer converting an acoustic signal into an electrical signal. The flow-rate measuring apparatus is configured to transmit a measurement signal having a plurality of frequencies and a time length by the first transducer, and receive the measurement signal by the second transducer through the fluid inside the pipe. The flow-rate measuring apparatus is further configured to calculate a first correlation coefficient between a reference signal corresponding to the transmitted measurement signal, and the received measurement signal. The flow-rate measuring apparatus is further configured to calculate the flow rate of the fluid inside the pipe based on the measurement signal, when a peak value of the first correlation coefficient is higher than a first threshold. The flow-rate measuring apparatus is further configured to retransmit the measurement signal with changing at least one of the frequency and the time length of the measurement signal, when the peak value of the first correlation coefficient is equal to or lower than the first threshold.

Thus, it is possible to accurately measure the flow rate of the fluid even when the fluid contains foreign objects.

According to the flow-rate measuring apparatus of the aspect of the present disclosure, when the first correlation coefficient is equal to or lower than the first threshold, the flow-rate measuring apparatus is configured to increase the time length of the measurement signal.

Thus, it is possible to reduce the influence of foreign objects as compared to before increasing the time length.

According to the flow-rate measuring apparatus of the aspect of the present disclosure, when the first correlation coefficient is equal to or lower than the first threshold, the flow-rate measuring apparatus is configured to increase a frequency bandwidth of the measurement signal.

Thus, it is possible to reduce the influence of foreign objects as compared to before increasing the frequency bandwidth.

According to the flow-rate measuring apparatus of the aspect of the present disclosure, when the first correlation coefficient is equal to or lower than the first threshold, the flow-rate measuring apparatus is configured to change a center frequency of the measurement signal.

Thus, it is possible to reduce the influence of foreign objects as compared to before changing the center frequency.

According to the flow-rate measuring apparatus of the aspect of the present disclosure, the measurement signal has a frequency varying with respect to time from a beginning.

Thus, the measurement signal is less likely to be masked by noises as compared with a case of using a single frequency signal or a short signal, and therefore, it is possible to accurately measure the flow rate of the fluid.

According to the flow-rate measuring apparatus of the aspect of the present disclosure, the flow-rate measuring apparatus is further configured to retransmit the measurement signal with changing at least one of the frequency and the time length of the measurement signal, when the peak value of the first correlation coefficient is equal to or lower than the first threshold, and equal to or higher than a second threshold that is lower than the first threshold. The flow-rate measuring apparatus is further configured to calculate a second correlation coefficient between the reference signal corresponding to the retransmitted measurement signal, and the received measurement signal. The flow-rate measuring apparatus is further configured to calculate the flow rate of the fluid inside the pipe based on the measurement signal, when a peak value of the second correlation coefficient is higher than the peak value of the first correlation coefficient. The flow-rate measuring apparatus is further configured to retransmit the measurement signal with reducing the first threshold, when the peak value of the second correlation coefficient does not increase from the peak value of the first correlation coefficient.

Thus, it is possible to accurately measure the flow rate of the fluid by dynamically changing the magnitude of the first threshold in accordance with the type of fluid, the type of foreign objects, the amount of foreign objects, and the like.

Advantageous Effects of Invention

According to the flow-rate measuring apparatus of one aspect of the present disclosure, it is possible to accurately measure the flow rate of the fluid even when the fluid contains foreign objects.

DESCRIPTION OF EMBODIMENTS

Figure 1:
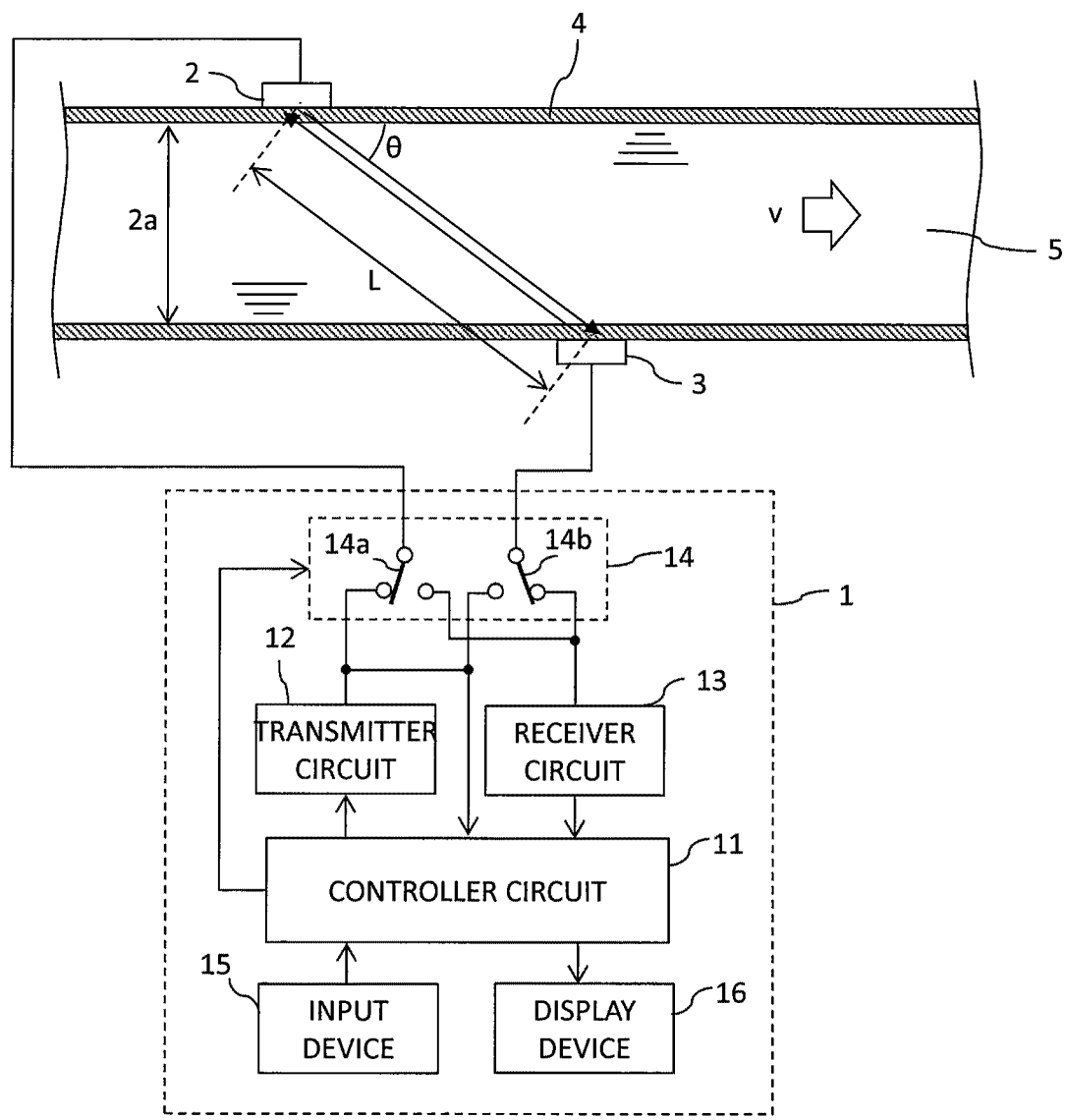
FIG. 1 is a block diagram illustrating a configuration of a flow-rate measuring apparatus 1 according to a first embodiment.

Hereinafter, embodiments according to one aspect of the present disclosure (hereinafter, also referred to as "the present embodiments") will be described with reference to the drawings. In the drawings, the same reference sign indicates similar components.

Application Example

FIG. 1 is a block diagram illustrating a configuration of a flow-rate measuring apparatus 1 according to the present embodiment. The flow-rate measuring apparatus 1 measures a flow rate of a fluid 5 inside a pipe 4 having a predetermined cross-sectional area. The fluid 5 may be a liquid or a gas. FIG. 1 illustrates a case where the pipe 4 has a circular cross section with an inner diameter of $2a$, but not limited thereto, the pipe 4 may have any shaped cross section.

The flow-rate measuring apparatus 1 is connected to transducers 2 and 3 provided at different positions in the pipe 4, respectively, the transducer 2 (or 3) converting an electrical signal into an acoustic signal, the transducer 3 (or 2) converting an acoustic signal into an electrical signal. The transducers 2 and 3 are provided in the pipe 4 so as to have a distance L from each other, and such that a straight line passing through the transducers 2 and 3 has an angle θ with respect to the longitudinal direction of the pipe 4 (for example, an inner surface of the pipe 4).

Each of the transducers 2 and 3 may convert an electrical signal and an acoustic signal into each other. The transducers 2 and 3 may be, for example, ultrasonic transducers converting an electrical signal and an ultrasonic signal into each other. The transducers 2 and 3 may be, for example, piezoelectric elements. In addition, each of the transducers 2 and 3 may be a combination of a transducer converting an electrical signal into an acoustic signal, and a transducer converting an acoustic signal into an electrical signal, which are arranged close to each other.

The flow-rate measuring apparatus 1 transmits a measurement signal having a plurality of frequencies and a time length by the transducer 2 (or 3), and receives the measurement signal by the transducer 3 (or 2) through the fluid 5 inside the pipe 4. The flow-rate measuring apparatus 1 calculates a correlation coefficient between a reference signal corresponding to the transmitted measurement signal, and the received measurement signal.

When a peak value of the correlation coefficient is higher than a threshold Th1, the flow-rate measuring apparatus 1 calculates the flow rate of the fluid 5 inside the pipe 4 based on the measurement signal. The peak value of the correlation coefficient higher than the threshold Th1 indicates that the measurement signal has been propagated between transducers 2 and 3 without being affected by foreign objects, such as dusts, air bubbles (when the fluid is a liquid). The flow rate of the fluid 5 may be calculated using any known method. For example, the flow rate of the fluid 5 may be calculated based on a propagation time of the measurement signal transmitted by the transducer 2 to the transducer 3, or vice versa. In addition, the flow rate of the fluid 5 may be calculated based on the Doppler shift occurring in the measurement signal transmitted by the transducer 2 (or 3) to the transducer 3 (or 2).

When the peak value of the correlation coefficient is equal to or lower than the threshold Th1, the flow-rate measuring apparatus 1 retransmits the measurement signal with changing at least one of the frequency and the time length of the measurement signal. The peak value of the correlation coefficient equal to or lower than the threshold Th1 indicates that the measurement signal has been propagated between transducers 2 and 3 with a waveform of the measurement signal being significantly changed due to the influence of foreign objects. In this case, for example, the flow-rate measuring apparatus 1 may increase the time length of the measurement signal, increase a frequency bandwidth of the measurement signal, or change a center frequency of the measurement signal.

According to the flow-rate measuring apparatus 1 of the present embodiment, even when the fluid 5 contains foreign objects, such as dusts, air bubbles, it is possible to reduce the influence of the foreign objects and accurately measure the flow rate of the fluid 5, by retransmitting the measurement signal with changing at least one of the frequency and the time length of the measurement signal.

In the present specification, one of the transducers 2 and 3 is also referred to as a "first transducer", and the other of the transducers 2 and 3 is also referred to as a "second transducer". In addition, in the present specification, the correlation coefficient between the reference signal corresponding to the transmitted measurement signal and the received measurement signal is also referred to as a "first correlation coefficient". In addition, in the present specification, the threshold Th1 is also referred to as a "first threshold".

First Embodiment

The flow-rate measuring apparatus according to a first embodiment will be described with reference to FIGS. 1 to 19.

[Configuration of Flow-Rate Measuring Apparatus]

FIG. 1 is the block diagram illustrating the configuration of the flow-rate measuring apparatus 1 according to the first embodiment. The flow-rate measuring apparatus 1 is provided with a controller circuit 11, a transmitter circuit 12, a receiver circuit 13, a switch circuit 14, an input device 15, and a display device 16.

The controller circuit 11 controls other components of the flow-rate measuring apparatus 1, and executes a flow-rate measurement process, which will be described later with reference to FIG. 2, to measure the flow rate of the fluid 5.

The transmitter circuit 12 generates the measurement signal under the control of the controller circuit 11. The measurement signal is generated so as to have a plurality of frequencies and a time length. The measurement signal may has continuous frequencies or discrete frequencies over a certain frequency bandwidth. The measurement signal may have, for example, a frequency varying with respect to time from the beginning, and may be, for example, a chirp signal (sweep signal). The measurement signal may include a partial time interval having a constant frequency, for example, at the beginning thereof. The generated measurement signal is passed to the transducers 2 and 3 via the switch circuit 14, and further passed to the controller circuit 11.

The receiver circuit 13 is connected to the transducers 2 and 3 via the switch circuit 14. The receiver circuit 13 obtains the measurement signal transmitted by one of the transducers 2 and 3, and received by the other of the transducers 2 and 3.

The switch circuit 14 includes switches 14a and 14b. The switch circuit 14 connects the transmitter circuit 12 to one of the transducers 2 and 3, and connects the receiver circuit 13 to the other of the transducers 2 and 3, under the control of the controller circuit 11.

The input device 15 instructs the controller circuit 11 to measure the flow rate of the fluid 5 in response to a user's inputs. The input device 15 includes, for example, a keyboard, a switch, and/or a pointing device.

The display device 16 displays the measured flow rate of the fluid 5.

The pipe 4 may be made of, for example, steel or plastic (for example, Teflon (registered trademark)). The pipe 4 has, for example, an outer diameter of 13 mm and an inner diameter of 8 mm. The pipe 4 may have a smaller size (for example, the outer diameter of 3 mm and the inner diameter of 1.6 mm) and may have a larger size (for example, the outer diameter of 60 mm).

[Operation of Flow-Rate Measuring Apparatus]

Figure 2:
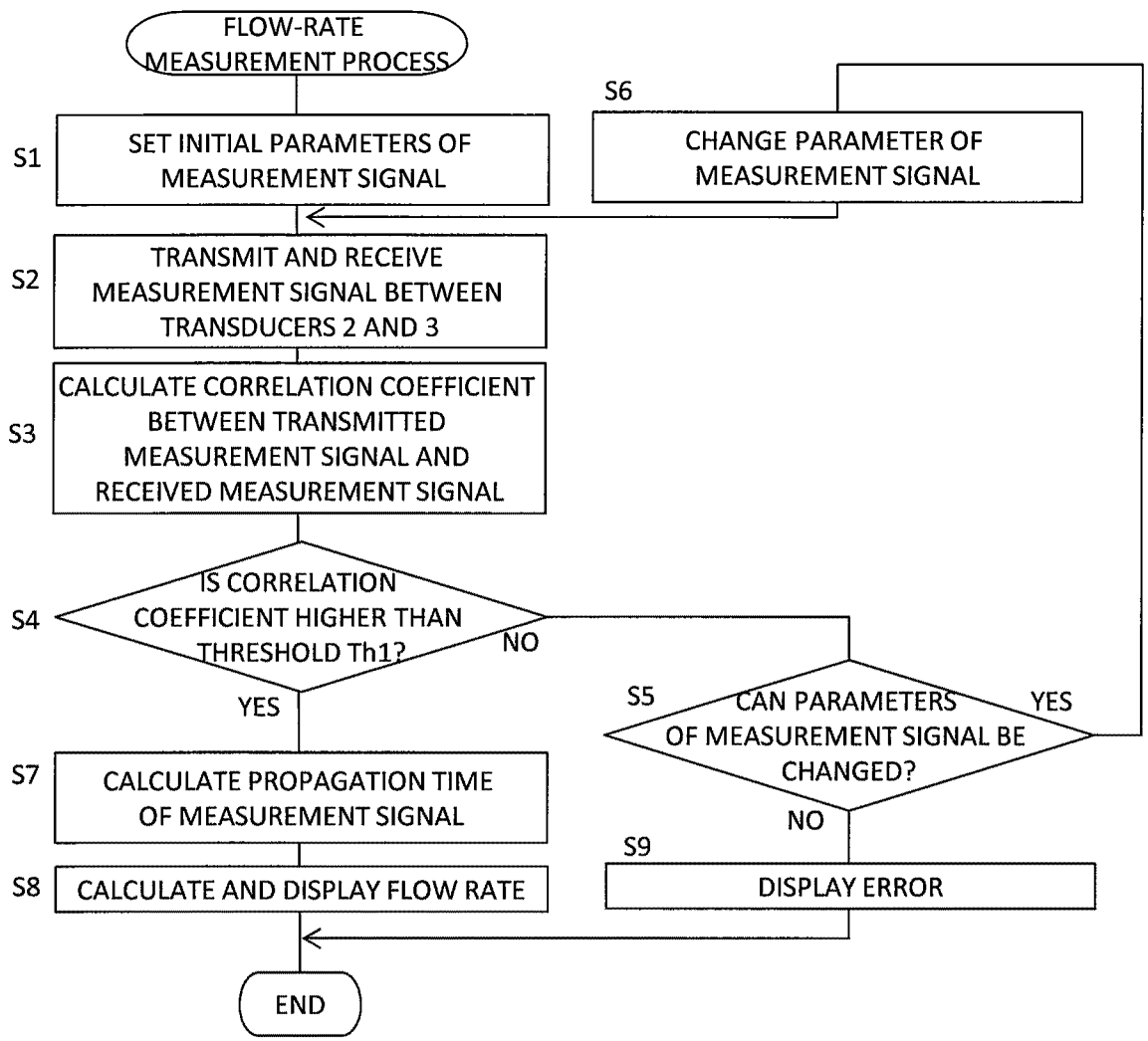
FIG. 2 is a flowchart illustrating a flow-rate measurement process executed by a controller circuit 11 of FIG. 1.

FIG. 2 is a flowchart illustrating a flow-rate measurement process executed by the controller circuit 11 of FIG. 1.

In Step S1, the controller circuit 11 sets initial values of parameters of a measurement signal to the transmitter circuit 12. The parameters of the measurement signal include frequencies and a time length of the measurement signal. When the measurement signal has continuous frequencies, the parameters of the measurement signal include a center frequency and a frequency bandwidth of the measurement signal. When the measurement signal has discrete frequencies, the parameters of the measurement signal include frequency components included in the measurement signal. The initial values of the parameters of the measurement signal may be obtained as a user's inputs via the input device 15, or may be read from a memory (not shown) connected to or built in the controller circuit 11.

In Step S2, the controller circuit 11 controls the switch circuit 14 to transmit a measurement signal by the transducer 2 and receive the measurement signal by the transducer 3, and then, transmit a measurement signal by the transducer 3 and receive the measurement signal by the transducer 2. The measurement signals propagate through the fluid 5 inside the pipe 4. The transmitter circuit 12 also passes the transmitted measurement signals to the controller circuit 11. The receiver circuit 13 passes the received measurement signals to the controller circuit 11.

In Step S3, the controller circuit 11 calculates a correlation coefficient between a reference signal corresponding to the measurement signal transmitted by the transducer 2, and the measurement signal received by the transducer 3, and further calculates a correlation coefficient between a reference signal corresponding to the measurement signal transmitted by the transducer 3, and the measurement signal received by the transducer 2. In the example of FIG. 1, the controller circuit 11 uses the measurement signal itself generated by the transmitter circuit 12, as the reference signal. For example, the controller circuit 11 samples the transmitted measurement signal f(x) and the received measurement signal g(x) at discrete times m=1, ..., M, to obtain discretized measurement signals f(m) and g(m). In this case, a correlation coefficient Cor(n) at time moment "n" is calculated, for example, as follows.

[MATHEMATICAL EXPRESSION 1]

$$Cor(n) = \frac{\sum_{m=1}^{M} f(m-n) \cdot g(m)}{\sqrt{\sum_{m=1}^{M} f^2(m-n)} \cdot \sqrt{\sum_{m=1}^{M} g^2(m)}}$$

The time moment "n" when the correlation coefficient Cor(n) reaches a peak value indicates a moment when the measurement signal is received.

In Step S4, the controller circuit 11 determines whether or not the peak values of the correlation coefficients are higher than the threshold Th1; if YES, the process proceeds to Step S7, and if NO, the process proceeds to Step S5. The threshold Th1 may be set to any value in the range of, for example, 0.5 to 0.9, and may be set to a value lower or higher than this range.

In Step S5, the controller circuit 11 determines whether or not the parameters of the measurement signal can be changed; if YES, the process proceeds to Step S6, and if NO, the process proceeds to Step S9.

In Step S6, the controller circuit 11 changes the parameters of the measurement signal. As described above, the measurement signal is changed for at least one of the frequency and time length of the measurement signal.

Figure 3:
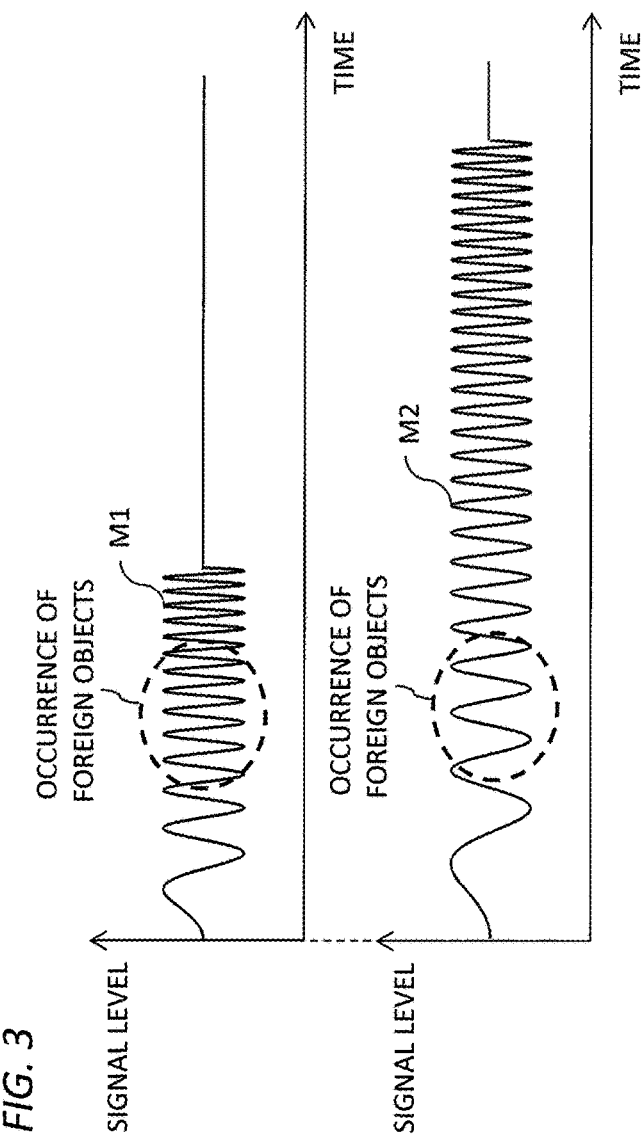
FIG. 3 is a graph illustrating waveforms of exemplary measurement signals M1 and M2 used in a flow-rate measurement process according to a first implementation example of the first embodiment.
Figure 4:
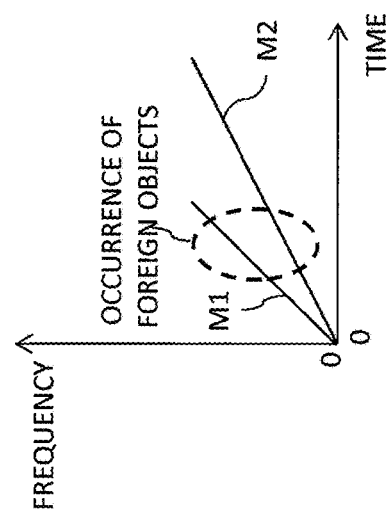
FIG. 4 is a graph illustrating frequency characteristics of the measurement signals M1 and M2 of FIG. 3.

FIG. 3 is a graph illustrating waveforms of exemplary measurement signals M1 and M2 used in a flow-rate measurement process according to a first implementation example of the first embodiment. FIG. 4 is a graph illustrating frequency characteristics of the measurement signals M1 and M2 of FIG. 3. The measurement signal M2 has a time length longer than a time length of the measurement signal M1. The measurement signal M1 has a time length of, for example, 20 microseconds. By increasing the time length of the measurement signal, it is possible to reduce the influence of foreign objects as compared to before increasing the time length.

Figure 5:
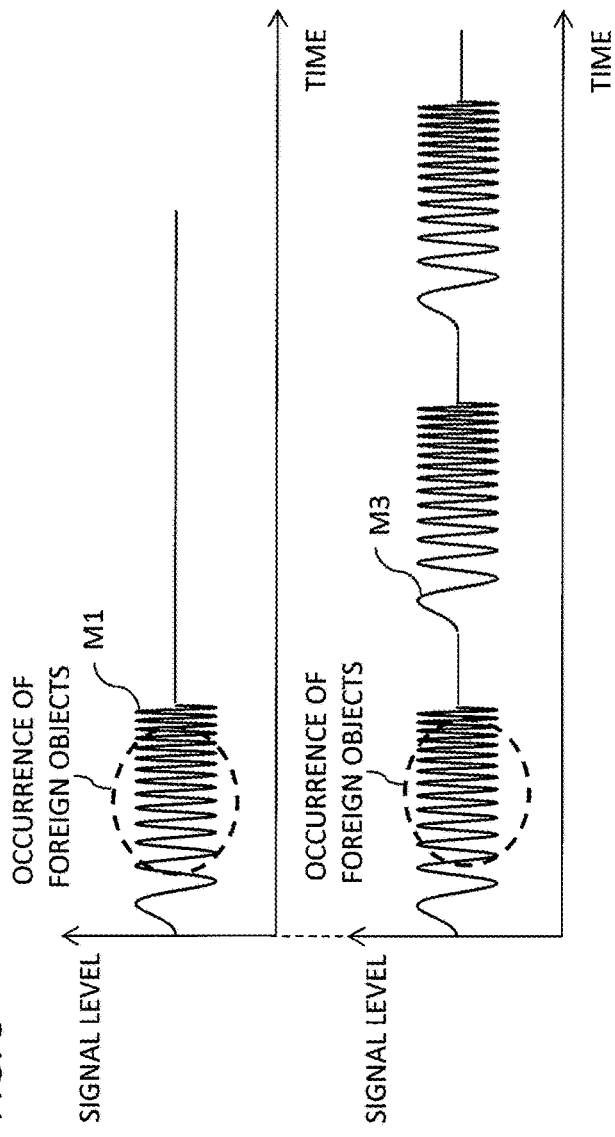
FIG. 5 is a graph illustrating waveforms of exemplary measurement signals M1 and M3 used in a flow-rate measurement process according to a second implementation example of the first embodiment.
Figure 6:
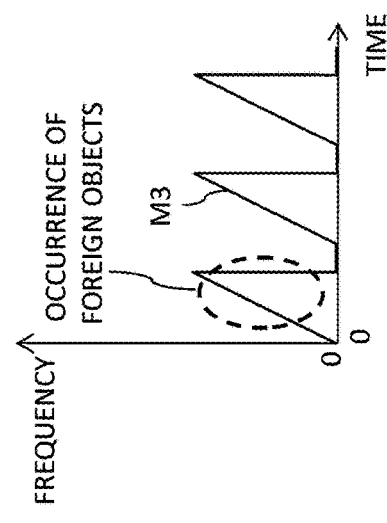
FIG. 6 is a graph illustrating frequency characteristics of the measurement signals M1 and M3 of FIG. 5.

FIG. 5 is a graph illustrating waveforms of exemplary measurement signals M1 and M3 used in a flow-rate measurement process according to a second implementation example of the first embodiment. FIG. 6 is a graph illustrating frequency characteristics of the measurement signals M1 and M3 of FIG. 5. The measurement signal M3 has the number of transmissions larger than the number of transmissions of the measurement signal M1. By increasing the number of transmissions of the measurement signal, it is possible to reduce the influence of foreign objects as compared to before increasing the number of transmissions.

Figure 7:
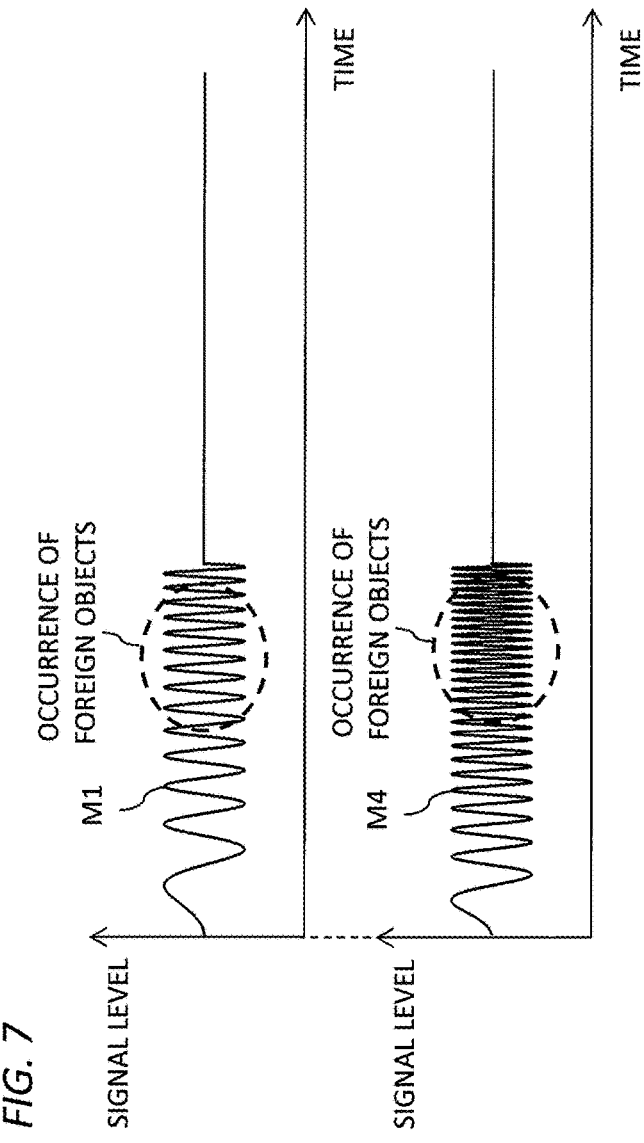
FIG. 7 is a graph illustrating waveforms of exemplary measurement signals M1 and M4 used in a flow-rate measurement process according to a third implementation example of the first embodiment.
Figure 8:
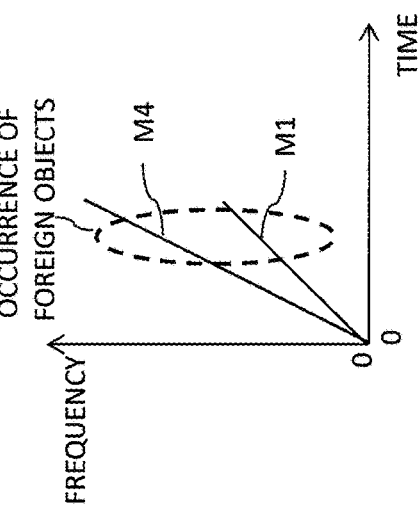
FIG. 8 is a graph illustrating frequency characteristics of the measurement signals M1 and M4 of FIG. 7.

FIG. 7 is a graph illustrating waveforms of exemplary measurement signals M1 and M4 used in a flow-rate measurement process according to a third implementation example of the first embodiment. FIG. 8 is a graph illustrating frequency characteristics of the measurement signals M1 and M4 of FIG. 7. The measurement signal M4 has a frequency bandwidth longer than the frequency bandwidth of the measurement signal M1. By increasing the frequency bandwidth of the measurement signal, it is possible to reduce the influence of foreign objects as compared to before increasing the frequency bandwidth.

Figure 9:
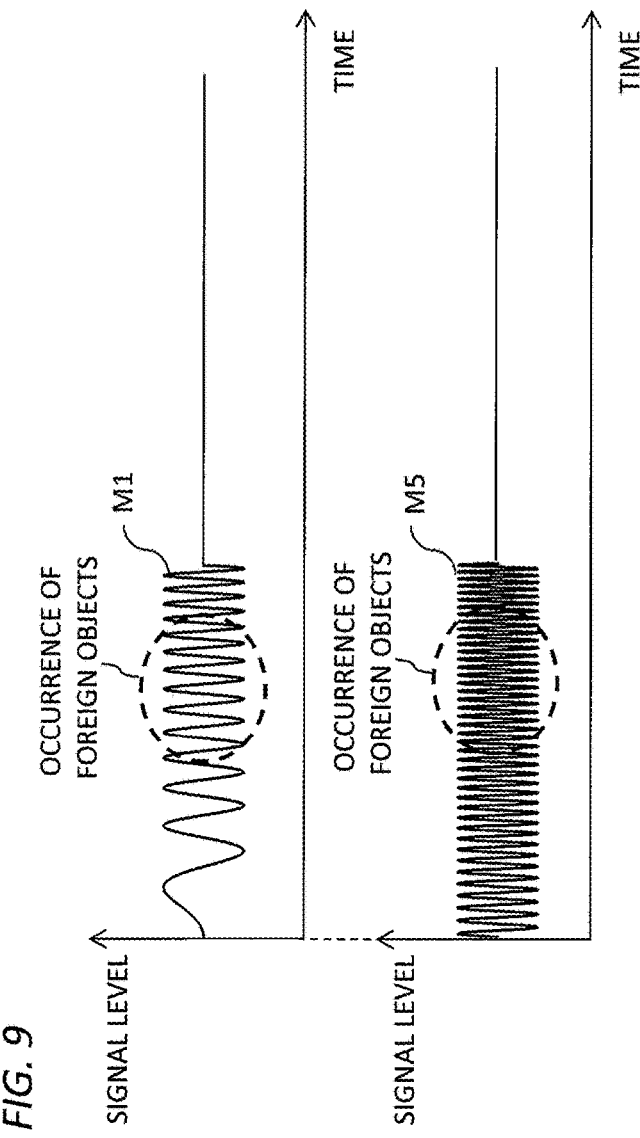
FIG. 9 is a graph illustrating waveforms of exemplary measurement signals M1 and M5 used in a flow-rate measurement process according to a fourth implementation example of the first embodiment.
Figure 10:
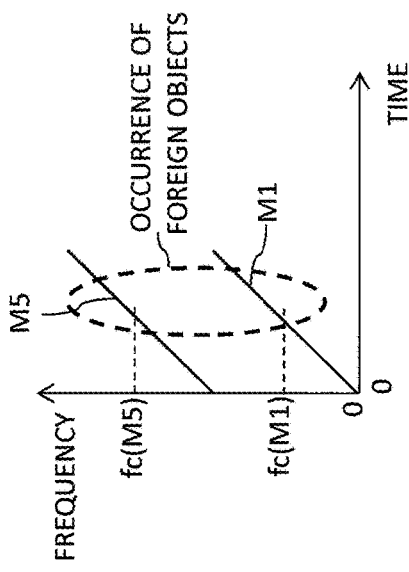
FIG. 10 is a graph illustrating frequency characteristics of the measurement signals M1 and M5 of FIG. 9.

FIG. 9 is a graph illustrating waveforms of exemplary measurement signals M1 and M5 used in a flow-rate measurement process according to a fourth implementation example of the first embodiment. FIG. 10 is a graph illustrating frequency characteristics of the measurement signals M1 and M5 of FIG. 9. The measurement signal M5 has a center frequency fc(M5) higher than a center frequency fc(M1) of the measurement signal M1. By changing the center frequency of the measurement signal, it is possible to reduce the influence of foreign objects as compared to before changing the center frequency. In particular, since a higher frequency band is more likely to contain characteristic frequency components, it is possible to facilitate reducing the influence of foreign objects by increasing the center frequency of the measurement signal.

After changing the parameters of the measurement signal in Step S6 of FIG. 2, the controller circuit 11 repeats the processes of Steps S2 to S4 to retransmit the measurement signals and recalculate the correlation coefficients thereof.

In Step S7 of FIG. 2, the controller circuit 11 calculates propagation times of the measurement signals. Here, the controller circuit 11 calculates a time length Ta from a moment when the transducer 2 transmits the measurement signal, to a moment when the transducer 3 receives the measurement signal (that is, the moment when the correlation coefficient of the measurement signal reaches its peak value). In addition, the controller circuit 11 calculates a time length Tb from a moment when the transducer 3 transmits a measurement signal, to a moment when the transducer 2 receives the measurement signal (that is, the moment when the correlation coefficient of the measurement signal reaches its peak value).

In Step S8, the controller circuit 11 calculates the flow rate of the fluid 5 based on the propagation times of the measurement signals, and displays the flow rate of the fluid 5 on the display device 16. The propagation time Ta of the measurement signal from the transducer 2 to the transducer 3 is given by Ta=L/(c+v·cos θ), where "v" denotes a velocity of the fluid 5, and "c" denotes a sound velocity. In addition, the propagation time Tb of the measurement signal from the transducer 3 to the transducer 2 is given by Tb=L/(c−v·cos θ). Therefore, the velocity "v" of the fluid 5 is given as follows.

[MATHEMATICAL EXPRESSION 2]

$$v = \frac{L}{2\cos\theta}\left(\frac{1}{Ta} - \frac{1}{Tb}\right)$$

A flow rate Q of the fluid 5 is given by a product of the cross-sectional area of the pipe 4, and the velocity v of the fluid 5. Therefore, in the example of FIG. 1, the flow rate Q of the fluid 5 is given by Q=πr²v.

On the other hand, in Step S9, the controller circuit 11 displays an error message on the display device 16, indicating that the flow rate of the fluid 5 can not be measured.

In Steps S5 to S6, a certain parameter of the measurement signal may be changed only once, or the same parameter of the measurement signal may be repeatedly changed a predetermined number of times. In addition, when the processes of Steps S5 to S6 are executed for the second time or later, a parameter of the measurement signal different from a last changed parameter of the measurement signal may be changed.

Figure 11:
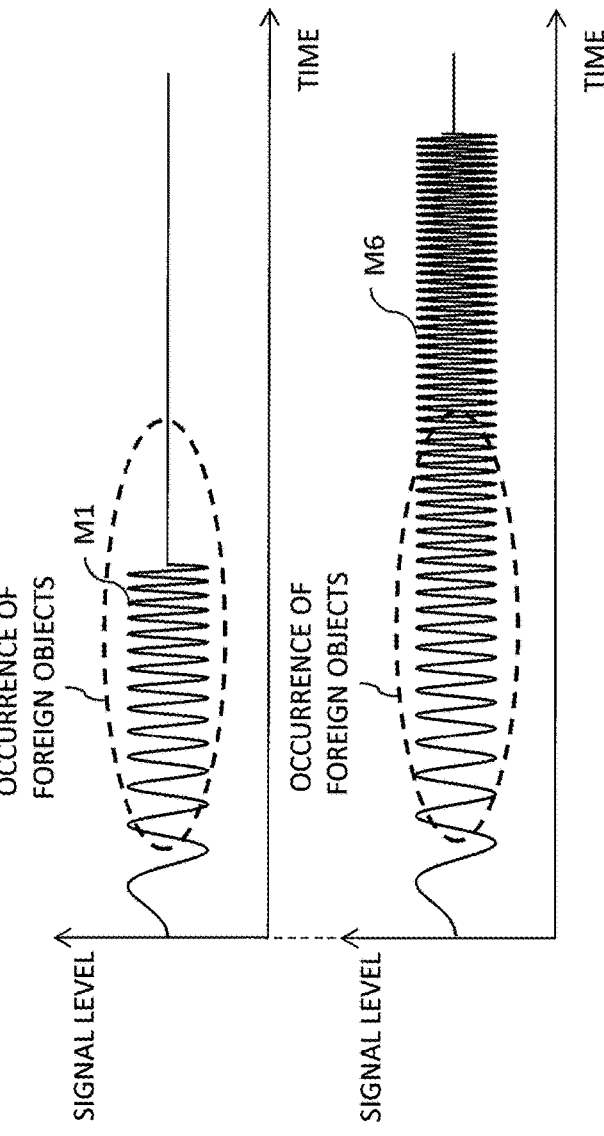
FIG. 11 is a graph illustrating waveforms of exemplary measurement signals M1 and M6 used in a flow-rate measurement process according to a fifth implementation example of the first embodiment.
Figure 12:
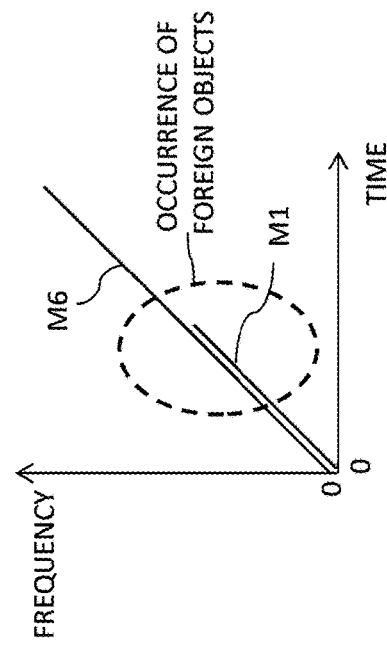
FIG. 12 is a graph illustrating frequency characteristics of the measurement signals M1 and M6 of FIG. 11.

FIG. 11 is a graph illustrating waveforms of exemplary measurement signals M1 and M6 used in a flow-rate measurement process according to a fifth implementation example of the first embodiment. FIG. 12 is a graph illustrating frequency characteristics of the measurement signals M1 and M6 of FIG. 11. The measurement signal M6 has a time length longer than a time length of the measurement signal M1, and further has a frequency bandwidth longer than a frequency bandwidth of the measurement signal M1. In many cases, it is considered that the influence of foreign objects can be reduced by increasing the time length of the measurement signal. However, when the influence of foreign objects can not be sufficiently reduced even by increasing the time length of the measurement signal, it is possible to more surely reduce the influence of foreign objects by further increasing the frequency bandwidth of the measurement signal.

Figure 13:
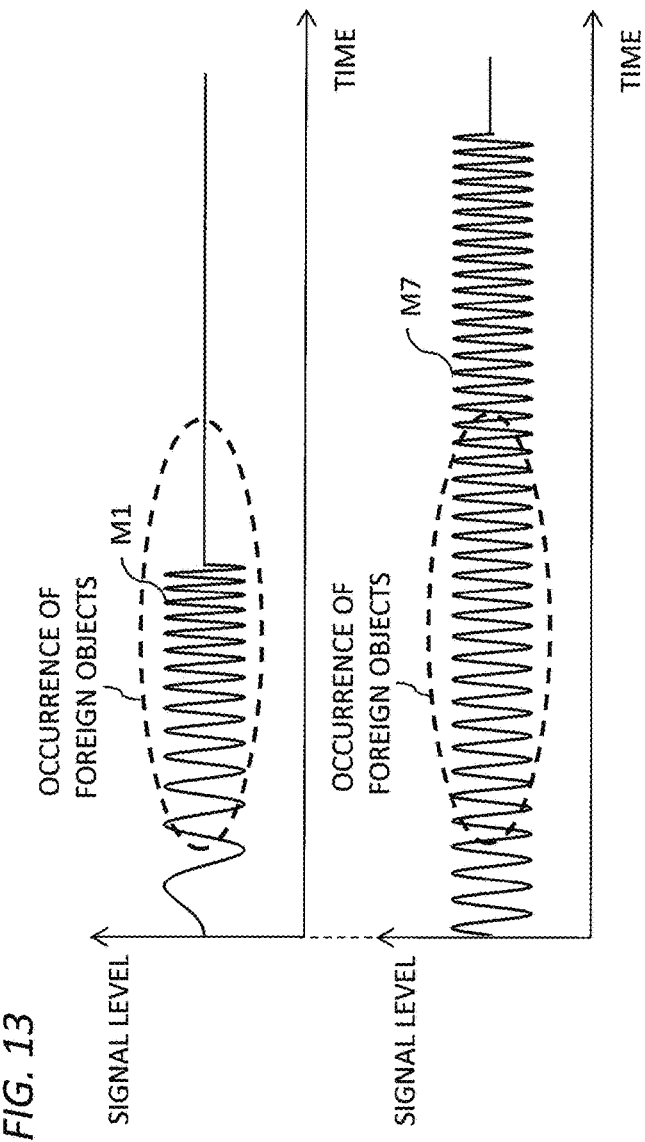
FIG. 13 is a graph illustrating waveforms of exemplary measurement signals M1 and M7 used in a flow-rate measurement process according to a sixth implementation example of the first embodiment.
Figure 14:
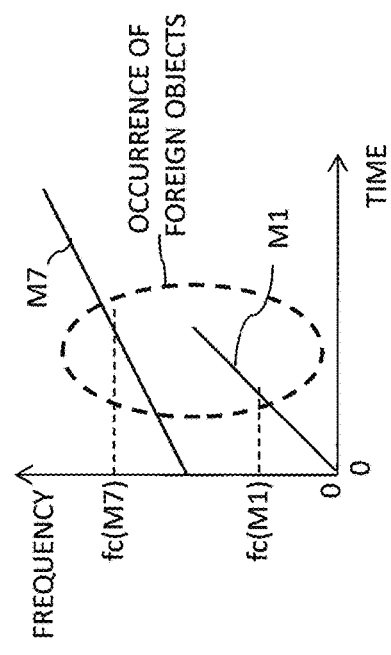
FIG. 14 is a graph illustrating frequency characteristics of the measurement signals M1 and M7 of FIG. 13.

FIG. 13 is a graph illustrating waveforms of exemplary measurement signals M1 and M7 used in a flow-rate measurement process according to a sixth implementation example of the first embodiment. FIG. 14 is a graph illustrating frequency characteristics of the measurement signals M1 and M7 of FIG. 13. The measurement signal M7 has a time length longer than the time length of the measurement signal M1, and further has a center frequency fc(M7) higher than a center frequency fc(M1) of the measurement signal M1. When the influence of foreign objects can not be sufficiently reduced even by increasing the time length of the measurement signal, it is possible to more surely reduce the influence of foreign objects by further changing the center frequency of the measurement signal.

Figure 15:
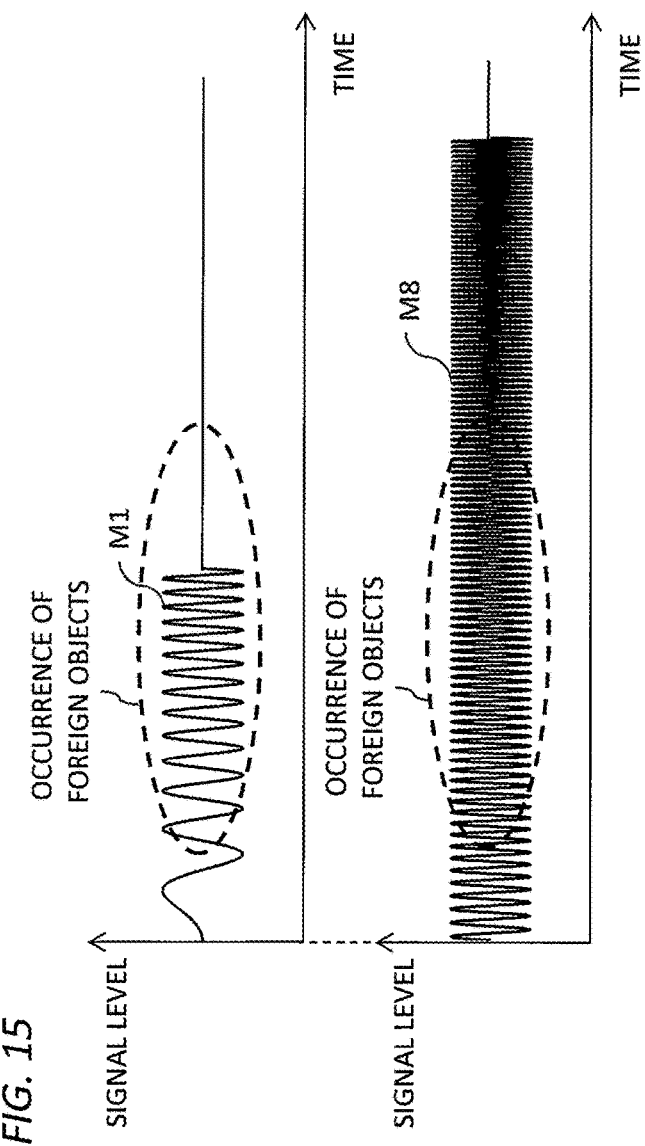
FIG. 15 is a graph illustrating waveforms of exemplary measurement signals M1 and M8 used in a flow-rate measurement process according to a seventh implementation example of the first embodiment.
Figure 16:
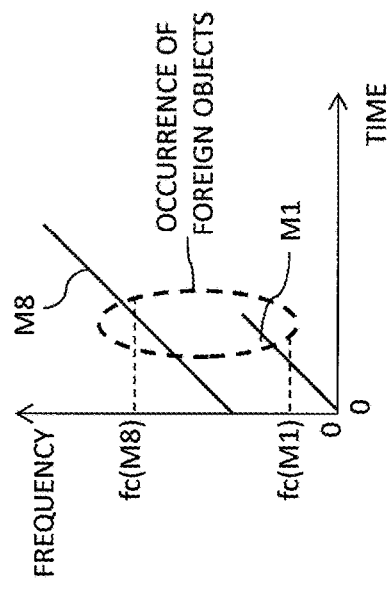
FIG. 16 is a graph illustrating frequency characteristics of the measurement signals M1 and M8 of FIG. 15.

FIG. 15 is a graph illustrating waveforms of exemplary measurement signals M1 and M8 used in a flow-rate measurement process according to a seventh implementation example of the first embodiment. FIG. 16 is a graph illustrating frequency characteristics of the measurement signals M1 and M8 of FIG. 15. The measurement signal M8 has a time length longer than a time length of the measurement signal M1, a frequency bandwidth longer than a frequency bandwidth of the measurement signal M1, and further, has a center frequency fc(M8) higher than a center frequency fc(M1) of the measurement signal M1. When the influence of foreign objects can not be sufficiently reduced even by changing the two parameters of the measurement signal, it is possible to more surely reduce the influence of foreign objects by further changing other parameters.

According to the flow-rate measuring apparatus 1 of the present embodiment, even when the fluid 5 contains foreign objects, it is possible to reduce the influence of the foreign objects and accurately measure the flow rate of the fluid 5, by changing the parameters of the measurement signal as illustrated in FIGS. 3 to 16.

The foreign objects may temporarily occur in the fluid 5. Therefore, when a predetermined time has elapsed after changing the parameters of the measurement signal, the parameters of the measurement signal may be reset to initial values.

In Step S4 of FIG. 2, it may be determined whether or not both the peak value of the correlation coefficient related to the measurement signal transmitted by the transducer 2 to the transducer 3, and the peak value of the correlation coefficient related to the measurement signal transmitted by the transducer 3 to the transducer 2 are higher than the threshold Th1. It is considered that when the fluid 5 contains foreign objects, the measurement signal transmitted by the transducer 2 to the transducer 3, and the measurement signal transmitted by the transducer 3 to the transducer 2 are affected by the foreign objects in almost the same manner. Therefore, as long as the conditions of Step S4 is not satisfied, the controller circuit 11 may transmit the measurement signal in only one direction between the transducers 2 and 3, and calculate only the correlation coefficient related to this measurement signal, in Steps S2 to S3. In this case, after the conditions of Step S4 is satisfied, the controller circuit 11 transmits the measurement signal in the other direction between the transducers 2 and 3, calculates the correlation coefficient related to that measurement signal, and then, executes the processes of Steps S7 to S8.

Although the case has been described with reference to FIG. 2 where the flow rate of the fluid 5 is calculated based on the propagation times of the measurement signals, alternatively, the flow rate of the fluid 5 may be calculated based on the Doppler shift occurring in the measurement signal. Let "fa" be a frequency of the transmitted measurement signal, and let "fb" be a frequency of the received measurement signal. The frequency fb is given by fb=fa×(c+v·cos θ)/(c−v·cos θ). The velocity v of the fluid 5 is given by v=c/(2 cos θ)·(fb−fa)/fb. Therefore, in the example of FIG. 1, the flow rate Q of the fluid 5 is given by Q=πr²v. In this case, the measurement signal may be transmitted in only one direction between the transducers 2 and 3. Even when the measurement signal has a plurality of frequencies, it is possible to calculate the flow rate of the fluid 5 in substantially the same manner as described above.

Modified Embodiments of First Embodiment

Figure 17:
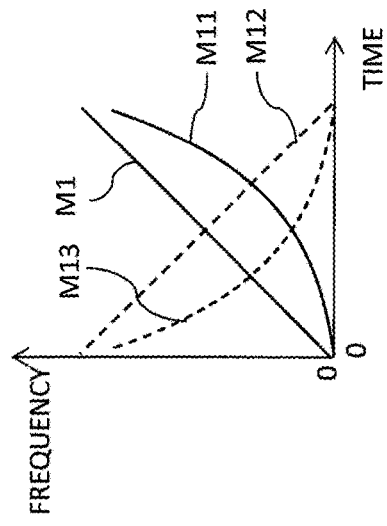
FIG. 17 is a graph illustrating frequency characteristics of measurement signals M11 to M13 used by flow-rate measuring apparatuses according to first to third modified embodiments of the first embodiment.

FIG. 17 is a graph illustrating frequency characteristics of measurement signals M11 to M13 used by flow-rate measuring apparatuses according to first to third modified embodiments of the first embodiment. FIGS. 3 to 16 illustrate the cases where a chirp signal having a frequency linearly increasing with respect to time from the beginning is used as the measurement signal. Alternatively, the measurement signals M11 to M13 illustrated in FIG. 17 may be used. The measurement signal M11 is a chirp signal having a frequency exponentially increasing with respect to time from the beginning. The measurement signal M12 is a chirp signal having a frequency linearly decreasing with respect to time from the beginning. The measurement signal M13 is a chirp signal having a frequency exponentially decreasing with respect to time from the beginning. Not limited to the measurement signals M1 to M13 illustrated in FIGS. 3 to 17, any other measurement signal can be used as long as the signal has a plurality of frequencies and a time length. An initial value or a final value of the frequency may be non-zero.

Figure 18:
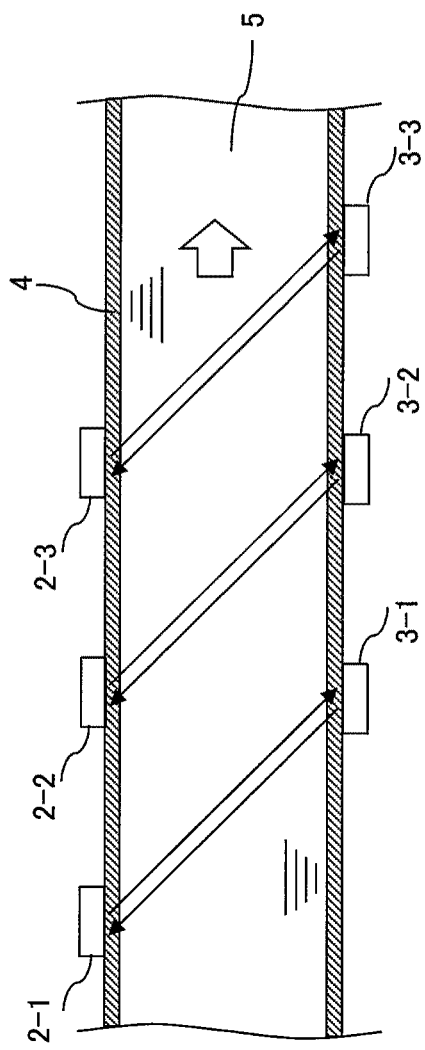
FIG. 18 is a view illustrating an arrangement of transducers 2-1 to 2-3 and 3-1 to 3-3 used by a flow-rate measuring apparatus according to a fourth modified embodiment of the first embodiment.

FIG. 18 is a view illustrating an arrangement of transducers 2-1 to 2-3 and 3-1 to 3-3 used by a flow-rate measuring apparatus according to a fourth modified embodiment of the first embodiment. The flow-rate measuring apparatus may transmit and receive a measurement signal between each pair of a plurality of pairs of transducers 2-1 to 2-3 and 3-1 to 3-3 to calculate each flow rate of a fluid 5, and calculate an average of a plurality of calculated flow rates. As a result, it is possible to more accurately calculate the flow rate of the fluid 5 than the case of using only one pair of transducers 2 and 3.

Figure 19:
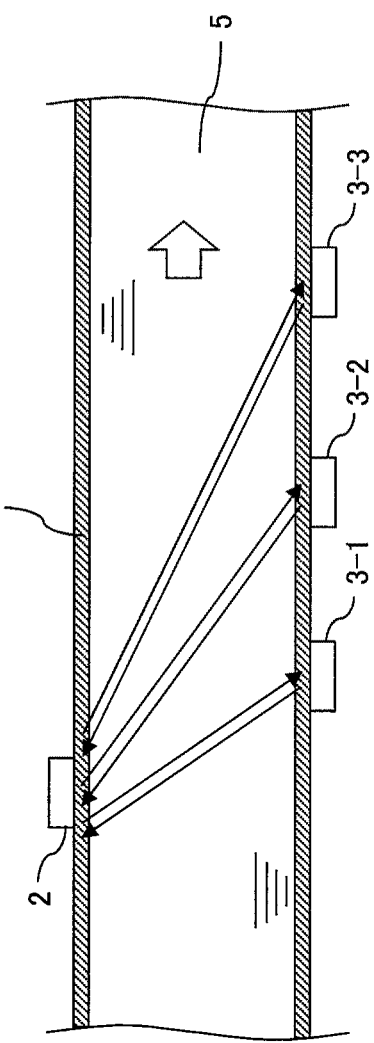
FIG. 19 is a view illustrating an arrangement of transducers 2 and 3-1 to 3-3 used by a flow-rate measuring apparatus according to a fifth modified embodiment of the first embodiment.

FIG. 19 is a view illustrating an arrangement of transducers 2 and 3-1 to 3-3 used by a flow-rate measuring apparatus according to a fifth modified embodiment of the first embodiment. The flow-rate measuring apparatus may transmit and receive a measurement signal between the transducers 2 and 3-1, transmit and receive a measurement signal between the transducers 2 and 3-2, transmit and receive a measurement signal between the transducers 2 and 3-3, calculate flow rates of the fluid 5 based on these measurement signals, respectively, and calculate an average of the calculated flow rates. As a result, it is possible to more accurately calculate the flow rate of the fluid 5 than the case of using only one pair of transducers 2 and 3.

Figure 20:
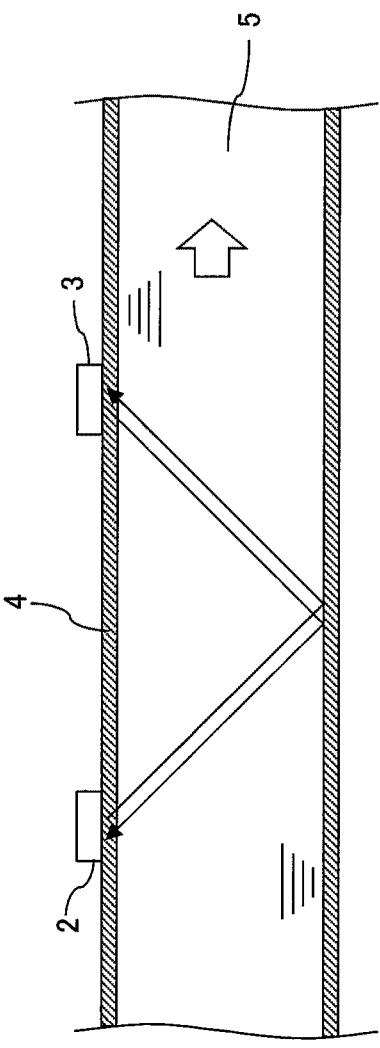
FIG. 20 is a view illustrating another arrangement of transducers 2 and 3 used by a flow-rate measuring apparatus according to a sixth modified embodiment of the first embodiment.

FIG. 20 is a view illustrating another arrangement of transducers 2 and 3 used by a flow-rate measuring apparatus according to a sixth modified embodiment of the first embodiment. The transducers 2 and 3 may be arranged such that a measurement signal transmitted by one transducer is reflected at least once by an inner surface of the pipe 4 before being received by the other transducer. If the fluid 5 does not flow in parallel to the longitudinal direction of the pipe 4 and has a radial velocity component, then an error occurs. In this case, by arranging the transducers 2 and 3 as illustrated in FIG. 20, it is possible to cancel the velocity components of the fluid 5 in the radial direction of the pipe 4, and therefore, an error is less likely to occur. In addition, by arranging the transducers 2 and 3 as illustrated in FIG. 20, it is possible to increase a path length of the measurement signal propagating in the fluid 5. As a result, it is possible to more accurately calculate a propagation time of the measurement signal, and therefore, more accurately calculate the flow rate of the fluid 5.

Figure 21:
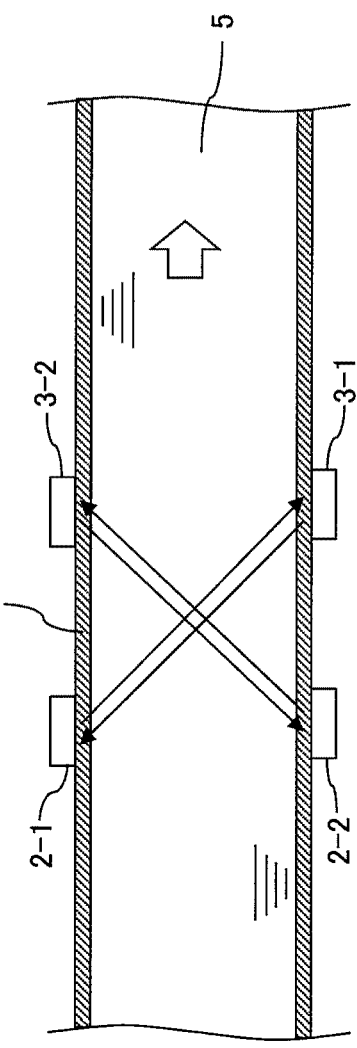
FIG. 21 is a view illustrating an arrangement of transducers 2-1, 2-2, 3-1, and 3-2 used by a flow-rate measuring apparatus according to a seventh modified embodiment of the first embodiment.

FIG. 21 is a view illustrating an arrangement of transducers 2-1, 2-2, 3-1, and 3-2 used by a flow-rate measuring apparatus according to a seventh modified embodiment of the first embodiment. The transducers 2-1, 2-2, 3-1, and 3-2 may be arranged such that a path of a measurement signal between the transducers 2-1 and 3-1 intersects a path of a measurement signal between the transducers 2-2 and 3-2. Spatial limitations may prevent the arrangement of the transducers 2 and 3 as illustrated in FIG. 20. In this case, by arranging the transducers 2-1, 2-2, 3-1, and 3-2 as illustrated in FIG. 21, it is possible to cancel the velocity components of the fluid 5 in the radial direction of the pipe 4, and therefore, an error is less likely to occur, in a manner similar to that of FIG. 20.

The flow-rate measuring apparatus 1 of FIG. 1 may repeatedly transmit and receive measurement signals between one pair of transducers 2 and 3, calculate flow rates of the fluid 5 based on these measurement signals, respectively, and calculate an average of the calculated flow rates. As a result, it is possible to more accurately calculate the flow rate of the fluid 5.

As described above, the reference signal for calculating the correlation coefficient may be the measurement signal itself generated by the transmitter circuit 12.

The reference signal for calculating the correlation coefficient may be generated by adjusting at least partial frequency components of the measurement signal generated by the transmitter circuit 12, in consideration of the frequency characteristics of the transducers 2 and 3. Due to the frequency characteristics of the transducers 2 and 3, the waveform of the electrical signal inputted from the transmitter circuit 12 to the transducers 2 and 3 differs from the waveform of the acoustic signal outputted from the transducers 2 and 3. Similarly, the waveform of the acoustic signal inputted to the transducers 2 and 3 differs from the waveform of the electrical signal inputted from the transducers 2 and 3 to the receiver circuit 13. For example, the reference signal may be generated by emphasizing frequency components near a resonance frequency of the transducers 2 and 3, among the plurality of frequency components of the measurement signal generated by the transmitter circuit 12.

The reference signal for calculating the correlation coefficient may be generated by monitoring the acoustic signal each time the transducers 2 and 3 output the acoustic signal.

The reference signal for calculating the correlation coefficient may be generated by averaging several acoustic signals outputted from the transducers 2 and 3. Alternatively, the reference signal for calculating the correlation coefficient may be generated by monitoring the acoustic signal inputted to the transducers 2 and 3 in an ideal state. Monitoring the measurement signal (electrical signal or acoustic signal) each time the transmitter circuit 12 generates the measurement signal leads to improved accuracy, but has a problem of increased processing load. Therefore, in order to reduce the processing load, the correlation coefficient may be calculated using a predetermined reference signal, such as the averaged acoustic signal or the ideal acoustic signal.

Advantageous Effects of First Embodiment

According to the flow-rate measuring apparatus 1 of the present embodiment, even when the fluid 5 contains foreign objects, and therefore, it is possible to reduce the influence of the foreign objects and accurately measure the flow rate of the fluid 5, by retransmitting the measurement signal with changing at least one of the frequency and the time length of the measurement signal.

According to the flow-rate measuring apparatus 1 of the present embodiment, it is possible to detect that the fluid 5 contains foreign objects, by calculating the correlation coefficient of the measurement signal.

According to the flow-rate measuring apparatus 1 of the present embodiment, since the measurement signal having the plurality of frequencies and the time length is used, the measurement signal is less likely to be masked by noises as compared with a case of using a single frequency signal or a short signal, and therefore, it is possible to accurately measure the flow rate of the fluid 5.

Second Embodiment

A flow-rate measuring apparatus according to a second embodiment will be described with reference to FIGS. 22 to 23. The magnitude of the correlation coefficient of the measurement signal varies depending on the type of the fluid, the type of foreign objects, the amount of the foreign objects, and the like. In consideration of this fact, the magnitude of the threshold to be compared with the correlation coefficient is dynamically changed in the second embodiment.

A flow-rate measuring apparatus 1 according to the second embodiment is configured in the same manner as the flow-rate measuring apparatus 1 according to the first embodiment (see FIG. 1), and executes a flow-rate measurement process described with reference to FIGS. 22 to 23.

Figure 22:
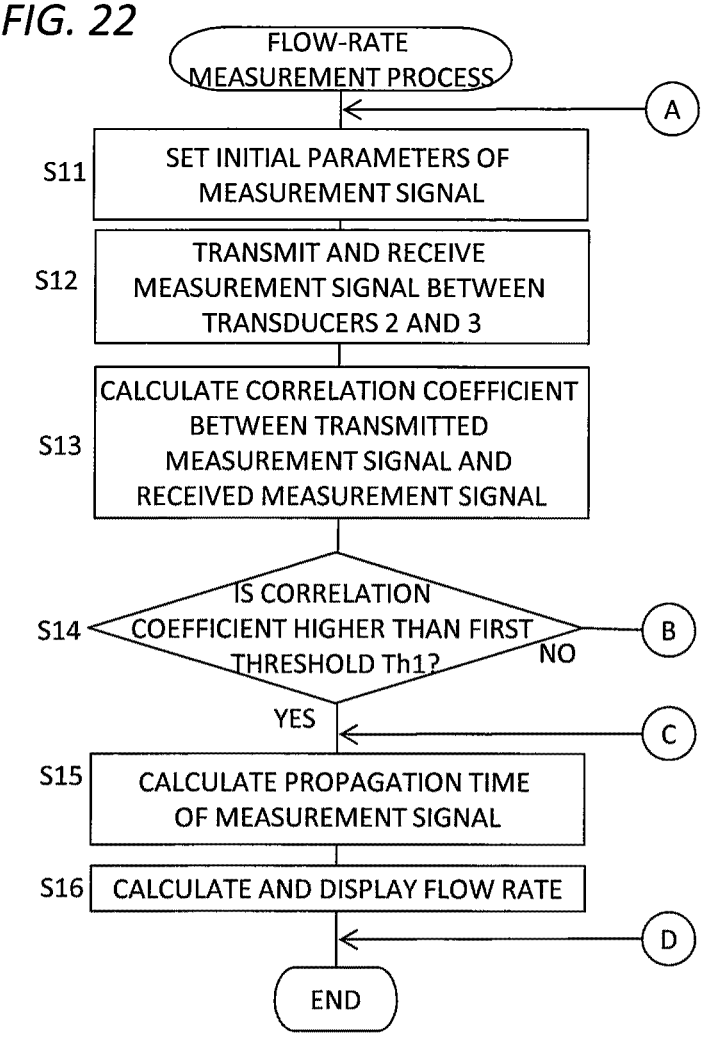
FIG. 22 is a flowchart illustrating a first part of a flow-rate measurement process executed by a controller circuit 11 of a flow-rate measuring apparatus 1 according to a second embodiment.

FIG. 22 is a flowchart illustrating a first part of the flow-rate measurement process executed by the controller circuit 11 of the flow-rate measuring apparatus 1 according to the second embodiment. FIG. 23 is a flowchart illustrating a second part of the flow-rate measurement process executed by the controller circuit 11 of the flow-rate measuring apparatus 1 according to the second embodiment.

In Step S11 of FIG. 22, the controller circuit 11 sets initial values of parameters of the measurement signal to the transmitter circuit 12. In Step S12, the controller circuit 11 transmits and receives the measurement signals between the transducers 2 and 3. In Step S13, the controller circuit 11 calculates the correlation coefficients between the reference signal corresponding to each of the transmitted measurement signals, and each of the received measurement signals. The controller circuit 11 temporarily stores the peak values of the calculated correlation coefficients. In Step S14, the controller circuit 11 determines whether or not the peak values of the correlation coefficients are higher than the first threshold Th1; if YES, the process proceeds to Step S15, and if NO, the process proceeds to Step S17 of FIG. 23. In Step S15, the controller circuit 11 calculates the propagation times of the measurement signals. In Step S16, the controller circuit 11 calculates the flow rate of the fluid 5 based on the propagation times of the measurement signals, and displays the flow rate of the fluid 5 on the display device 16. Steps S11 to S16 of FIG. 22 are substantially the same as Steps S1 to S4, S7, and S8 of FIG. 2.

Figure 23:
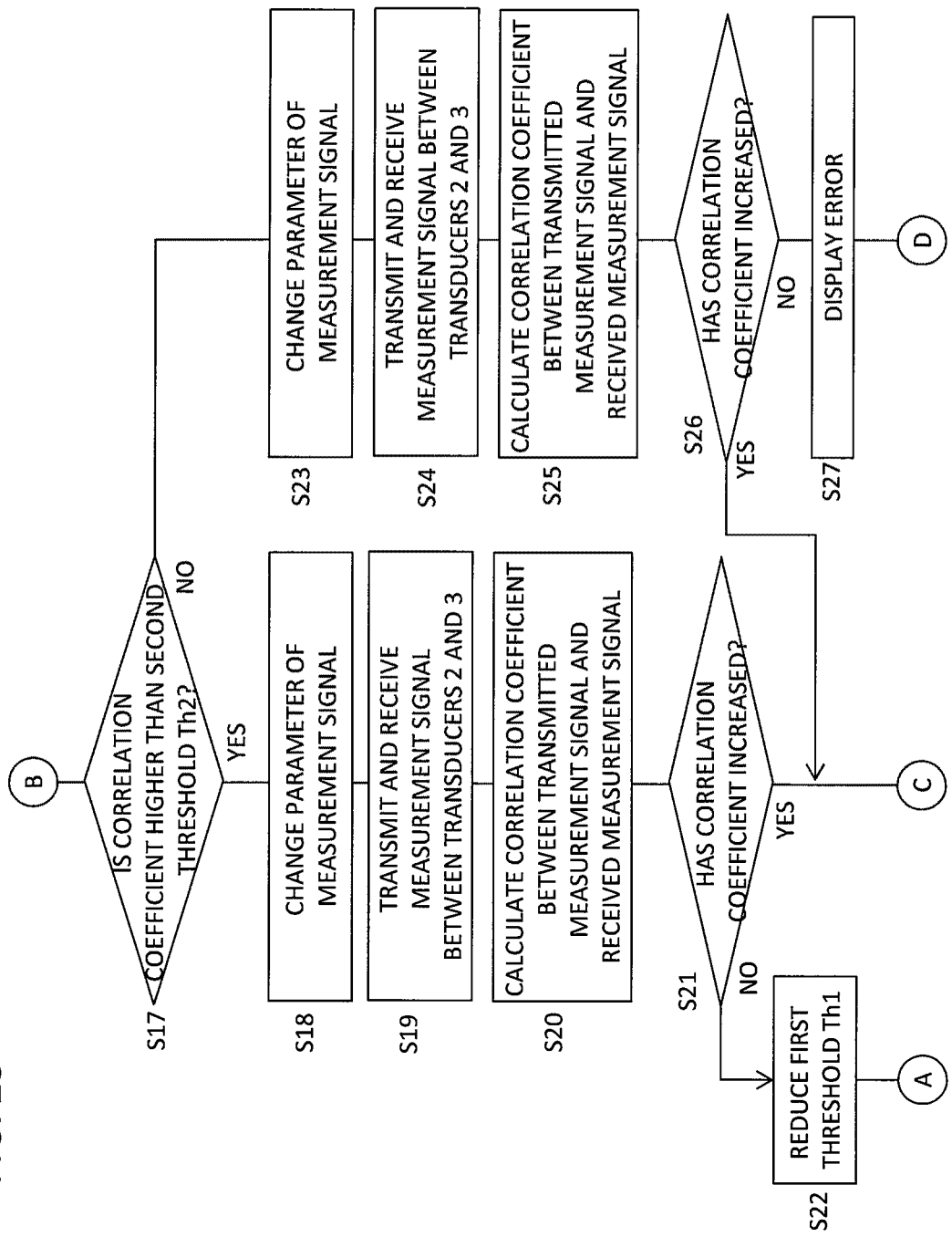
FIG. 23 is a flowchart illustrating a second part of the flow-rate measurement process executed by the controller circuit 11 of the flow-rate measuring apparatus 1 according to the second embodiment.

In Step S17 of FIG. 23, the controller circuit 11 determines whether or not the peak values of the correlation coefficients are higher than a second threshold Th2; if YES, the process proceeds to Step S18, and if NO, the process proceeds to Step S23. The second threshold Th2 is set to a value lower than the first threshold Th1. For example, if the first threshold Th1 is set to 0.5, the second threshold Th2 may be set to 0.1.

In Step S18, the controller circuit 11 changes the parameters of the measurement signal. In Step S18, at least one of the frequency and the time length of the measurement signal is changed in a manner similar to that of Step S6 of FIG. 2. In Step S19, the controller circuit 11 transmits and receives the measurement signals between the transducers 2 and 3. In Step S20, the controller circuit 11 calculates the correlation coefficient between the reference signal corresponding to each of the transmitted measurement signals, and each of the received measurement signals. In Step S21, the controller circuit 11 determines whether or not the peak values of the correlation coefficients calculated in Step S20 have increased from the peak values of the correlation coefficients calculated in Step S13 of FIG. 22; if YES, the process proceeds to Step S15 of FIG. 22, and if NO, the process proceeds to Step S22 of FIG. 23. In Step S21, the controller circuit 11 may determine whether or not the peak values of the correlation coefficients have substantially increased, for example, whether or not the peak values have increased by an amount of change larger than a predetermined amount of change (for example, +0.2). In Step S22, the controller circuit 11 reduces the first threshold Th1 by a predetermined magnitude, for example, 0.2.

After reducing the first threshold Th1 in Step S22 of FIG. 23, the controller circuit 11 repeats the processes of Steps S11 to S14 of FIG. 22 to retransmit the measurement signals and recalculate the correlation coefficients thereof.

In Step S23 of FIG. 23, the controller circuit 11 changes the parameters of the measurement signal. In Step S23, at least one of the frequency and the time length of the measurement signal is changed in a manner similar to that of Step S6 of FIG. 2. In Step S24, the controller circuit 11 transmits and receives the measurement signals between the transducers 2 and 3. In Step S25, the controller circuit 11 calculates the correlation coefficient between the reference signal corresponding to each of the transmitted measurement signals, and each of the received measurement signals. In Step S26, the controller circuit 11 determines whether or not the peak values of the correlation coefficients calculated in Step S25 have increased from the peak values of the correlation coefficients calculated in Step S13 of FIG. 22 (for example, increased by an amount of change larger than 0.2); if YES, the process proceeds to Step S15 of FIG. 22, and if NO, the process proceeds to Step S27 of FIG. 23. In Step S27, the controller circuit 11 displays an error message on the display device 16, indicating that the flow rate of the fluid 5 can not been measured.

According to the flow-rate measurement process of FIGS. 22 and 23, it is possible to accurately measure the flow rate of the fluid 5 by dynamically changing the magnitude of the first threshold Th1 in accordance with the type of fluid, the type of foreign objects, the amount of foreign objects, and the like.

Even if the first threshold Th1 is reduced in Step S22 of FIG. 23, The processes of Steps S18 to S22 of FIG. 23 may be repeated while the first threshold Th1 is higher than the second threshold Th2.

The foreign objects may temporarily occur in the fluid 5. Therefore, when a predetermined time elapses after changing the parameters of the measurement signal, the parameters of the measurement signal may be reset to initial values. In addition, when a predetermined time elapses after reducing the first threshold Th1, the first threshold Th1 may be reset to the initial value (for example, 0.5).

In the present specification, the correlation coefficients calculated before changing the parameters of the measurement signal in Step S18 or S23 of FIG. 23 (that is, the correlation coefficients calculated at Step S13 of FIG. 22) are also referred to as "first correlation coefficients". In addition, in the present specification, the correlation coefficients calculated after changing the parameters of the measurement signal in Step S18 or S23 of FIG. 23 (that is, the correlation coefficients calculated at Step S20 or S25 of FIG. 22) are also referred to as "second correlation coefficients".

Although the case has been described with reference to FIGS. 22 and 23 where the flow rate of the fluid 5 is calculated based on the propagation times of the measurement signals, alternatively, the flow rate of the fluid 5 may be calculated based on the Doppler shift occurring in the measurement signal as described in the first embodiment.

Advantageous Effects of Second Embodiment

According to the flow-rate measuring apparatus 1 of the second embodiment, it is possible to accurately measure the flow rate of the fluid 5 by dynamically changing the magnitude of the first threshold Th1 in accordance with the type of fluid, the type of foreign objects, the amount of foreign objects, and the like.

Summary of Embodiments

The flow-rate measuring apparatuses according to aspects of the present disclosure may be expressed as follows.

According to a flow-rate measuring apparatus of a first aspect of the present disclosure, a flow-rate measuring apparatus 1 is provided for measuring a flow rate of a fluid 5 inside a pipe 4 having a predetermined cross-sectional area. The flow-rate measuring apparatus 1 is connected to a first and second transducers provided at different positions in the pipe 4, respectively, the first transducer converting an electrical signal into an acoustic signal, the second transducer converting an acoustic signal into an electrical signal. The flow-rate measuring apparatus 1 is configured to transmit a measurement signal having a plurality of frequencies and a time length by the first transducer, and receive the measurement signal by the second transducer through the fluid 5 inside the pipe 4. The flow-rate measuring apparatus 1 is further configured to calculate a first correlation coefficient between a reference signal corresponding to the transmitted measurement signal, and the received measurement signal. The flow-rate measuring apparatus 1 is further configured to calculate the flow rate of the fluid 5 inside the pipe 4 based on the measurement signal, when a peak value of the first correlation coefficient is higher than a first threshold Th1. The flow-rate measuring apparatus 1 is further configured to retransmit the measurement signal with changing at least one of the frequency and the time length of the measurement signal, when the peak value of the first correlation coefficient is equal to or lower than the first threshold Th1.

According to a flow-rate measuring apparatus of a second aspect of the present disclosure, in the flow-rate measuring apparatus of the first aspect, when the first correlation coefficient is equal to or lower than the first threshold Th1, the flow-rate measuring apparatus 1 is configured to increase the time length of the measurement signal.

According to a flow-rate measuring apparatus of a third aspect of the present disclosure, in the flow-rate measuring apparatus of the first or second aspect, when the first correlation coefficient is equal to or lower than the first threshold Th1, the flow-rate measuring apparatus 1 is configured to increase a frequency bandwidth of the measurement signal.

According to a flow-rate measuring apparatus of a fourth aspect of the present disclosure, in the flow-rate measuring apparatus of any one of the first to third aspects, when the first correlation coefficient is equal to or lower than the first threshold Th1, the flow-rate measuring apparatus 1 is configured to change a center frequency of the measurement signal.

According to a flow-rate measuring apparatus of a fifth aspect of the present disclosure, in the flow-rate measuring apparatus of any one of the first to fourth aspects, the measurement signal has a frequency varying with respect to time from a beginning.

According to a flow-rate measuring apparatus of a sixth aspect of the present disclosure, in the flow-rate measuring apparatus of any one of the first to fifth aspects, the flow-rate measuring apparatus 1 is further configured to retransmit the measurement signal with changing at least one of the frequency and the time length of the measurement signal, when the peak value of the first correlation coefficient is equal to or lower than the first threshold Th1, and equal to or higher than a second threshold Th2 that is lower than the first threshold Th1. The flow-rate measuring apparatus 1 is further configured to calculate a second correlation coefficient between the reference signal corresponding to the retransmitted measurement signal, and the received measurement signal. The flow-rate measuring apparatus 1 is further configured to calculate the flow rate of the fluid 5 inside the pipe 4 based on the measurement signal, when a peak value of the second correlation coefficient is higher than the peak value of the first correlation coefficient. The flow-rate measuring apparatus 1 is further configured to retransmit the measurement signal with reducing the first threshold Th1, when the peak value of the second correlation coefficient does not increase from the peak value of the first correlation coefficient.

INDUSTRIAL APPLICABILITY

According to the present disclosure, a flow-rate measuring apparatus 1 is provided, which measures a flow rate of a fluid 5 inside a pipe having a predetermined cross-sectional area, and which is capable of accurately measuring the flow rate of the fluid 5 even when the fluid 5 contains foreign objects.

REFERENCE SIGNS LIST

1: FLOW-RATE MEASURING APPARATUS
2, 2-1 to 2-3, 3, 3-1 to 3-3: TRANSDUCER
4: PIPE
5: FLUID
11: CONTROLLER CIRCUIT
12: TRANSMITTER CIRCUIT
13: RECEIVER CIRCUIT
14: SWITCH CIRCUIT
15: INPUT DEVICE
16: DISPLAY DEVICE

The invention claimed is:
1. A flow-rate measuring apparatus for measuring a flow rate of a fluid inside a pipe having a predetermined cross-sectional area,
wherein the flow-rate measuring apparatus is connected to a first and second transducers provided at different positions in the pipe, respectively, the first transducer converting an electrical signal into an acoustic signal, the second transducer converting an acoustic signal into an electrical signal,
wherein the flow-rate measuring apparatus is configured to:
transmit a measurement signal having a plurality of frequencies and a time length by the first transducer, and receive the measurement signal by the second transducer through the fluid inside the pipe, calculate a first correlation coefficient between a reference signal corresponding to the transmitted measurement signal, and the received measurement signal, calculate the flow rate of the fluid inside the pipe based on the measurement signal, when a peak value of the first correlation coefficient is higher than a first threshold, and retransmit the measurement signal with changing at least one of the frequency and the time length of the measurement signal, when the peak value of the first correlation coefficient is equal to or lower than the first threshold.

2. The flow-rate measuring apparatus according to claim 1, wherein, when the first correlation coefficient is equal to or lower than the first threshold, the flow-rate measuring apparatus is configured to increase the time length of the measurement signal.

3. The flow-rate measuring apparatus according to claim 1, wherein, when the first correlation coefficient is equal to or lower than the first threshold, the flow-rate measuring apparatus is configured to increase a frequency bandwidth of the measurement signal.

4. The flow-rate measuring apparatus according to claim 1, wherein, when the first correlation coefficient is equal to or lower than the first threshold, the flow-rate measuring apparatus is configured to change a center frequency of the measurement signal.

5. The flow-rate measuring apparatus according to claim 1, wherein the measurement signal has a frequency varying with respect to time from a beginning.

6. The flow-rate measuring apparatus according to claim 1, wherein the flow-rate measuring apparatus is configured to:

retransmit the measurement signal with changing at least one of the frequency and the time length of the measurement signal, when the peak value of the first correlation coefficient is equal to or lower than the first threshold, and equal to or higher than a second threshold Th2 that is lower than the first threshold, calculate a second correlation coefficient between the reference signal corresponding to the retransmitted measurement signal, and the received measurement signal, calculate the flow rate of the fluid inside the pipe based on the measurement signal, when a peak value of the second correlation coefficient is higher than the peak value of the first correlation coefficient, and retransmit the measurement signal with reducing the first threshold, when the peak value of the second correlation coefficient does not increase from the peak value of the first correlation coefficient.

* * * * *